2,807,608

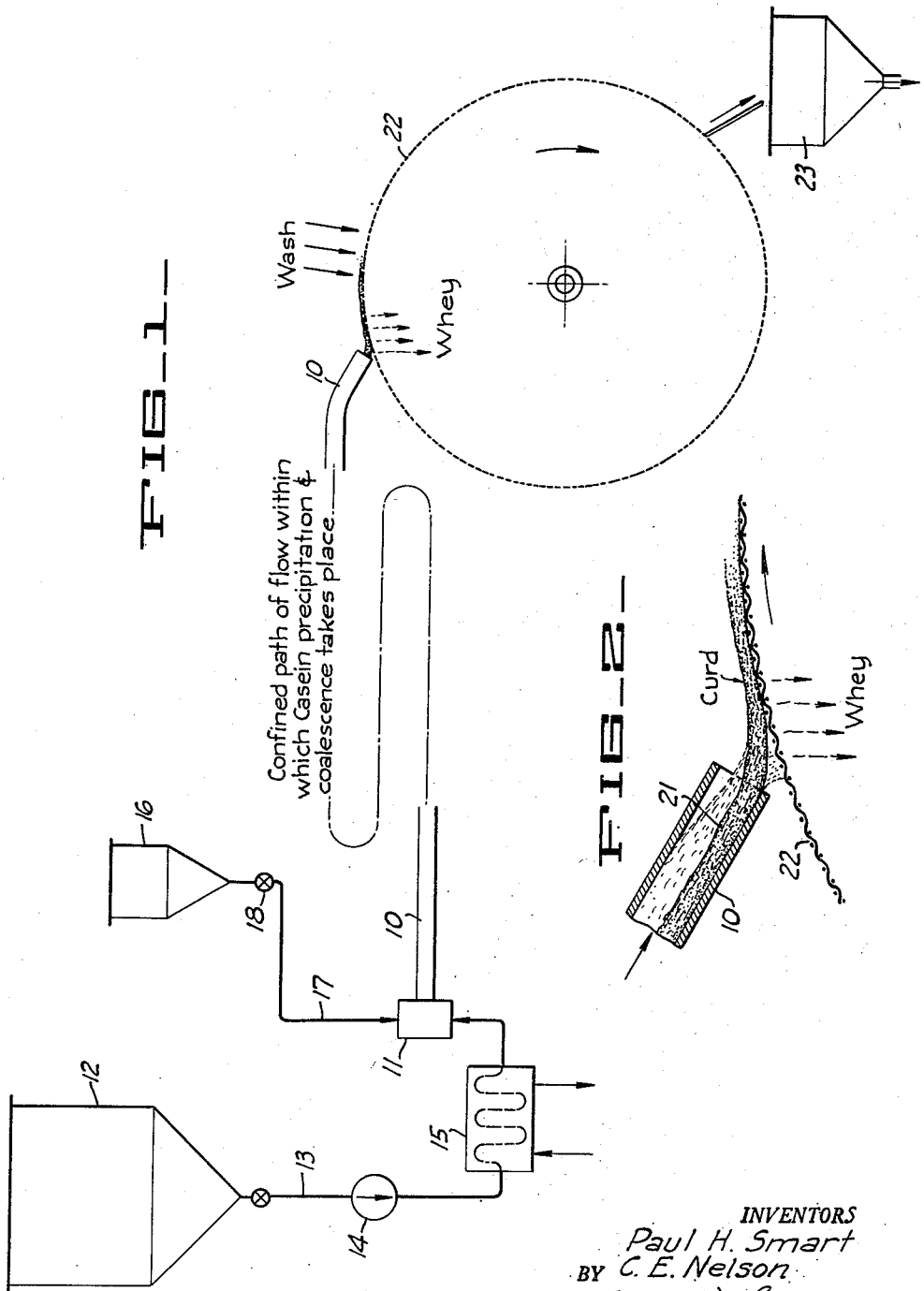

PROCESS AND APPARATUS FOR MANUFACTURE OF CASEIN

Paul H. Smart and Carl E. Nelson, Appleton, Wis., assignors, by mesne assignments, to Foremost Dairies, Inc., San Francisco, Calif., a corporation of New York Application March 23, 1954, Serial No. 418,055

10 Claims. (Cl. 260—120)

This invention relates generally to processes and apparatus for the manufacture of casein from lacteal materials, such as skim milk, which contain casein in colloidal solution. More particularly it relates to a process that can be used to produce a casein suitable for use in the manufacture of high protein milks as disclosed in co-pending application Serial No. 397,954, filed December 14, 1953.

In the past conventional processes for the manufacture of cottage and other types of cheese have been carried out by use of batch precipitation of casein from skim milk, as distinguished from a continuous process. Batch treatment requires a relatively large number of treatment steps, all of which require many hours to complete. For example in one commercial method for the manufacture of cottage cheese, the lactic acid is developed by fermentation of skim milk over a period of from five to twelve hours, and the casein precipitated by the developed acidity and added rennet. The curd is then cut and is firmed by heating, over a working period of from one to two hours. Removal of the whey from the curd as by decantation requires from 7 to 15 minutes, and subsequent washing successively with warm water, cool tap water and then chilled water, requires from 45 minutes to two hours. Following washing, draining of the water requires from one to two hours. It is evident that such a process involves a large amount of labor which increases the cost of manufacture. The equipment employed requires a large floor area, and is relatively expensive per pound of cottage cheese manufactured. Because of the fermentation process and repeated handling of the material, the resulting cottage cheese has a relatively high bacterial count.

Commercial casein has been made by both batch and continuous processes. However when such continuous processes are controlled to produce a casein theoretically usable for the purposes of said co-pending application, a curd is obtained which cannot be washed or treated with uniformity without excessive casein loss.

In general it is an object of the present invention to provide a continuous casein manufacturing process which produces casein curd in a form that can be readily washed without excessive loss.

A further object of the invention is to provide a process of the above character which is characterized by progressive and continuous precipitation of casein and by concomitant coalescing of precipitated casein into a soft curd mass.

Another object of the invention is to provide a continuous process of the above character which is well adapted for the manufacture of edible forms of casein, including casein curd which can be readily reconstituted with milk to form a stable colloidal solution.

Another object of the invention is to provide novel apparatus for carrying out the foregoing process.

Additional objects and features of the invention will appear from the following description in which the preferred embodiment of the invention has been set forth in detail in conjunction with the accompanying drawing.

Referring to the drawing:

Figure 1 is a side elevational view, schematically illustrating apparatus incorporating the present invention.

Figure 2 is an enlarged cross sectional detail illustrating the discharge of curd and the separation of whey therefrom.

The present invention involves the continuous flow of a lacteal material, like skim milk, through an elongated confined path. The acidulation is such as to cause progressive coagulation and precipitation of casein to take place. The rate of flow is such as to cause continual coalescence of precipitated casein whereby at the discharge end of the apparatus the casein is delivered in the form of a rope-like mass.

The simple apparatus illustrated schematically in Figure 1 consists of an extended tube 10, having a mixing head 11 at its inlet end. A lacteal material, such as skim milk, is supplied to the head 11 at a constant rate, and is there intermixed with acid. Storage tank 12 represents a source of skim milk which is delivered through pipe 13 at a rate controlled by suitable means such as the pump 14. Heat exchanger 15 or other suitable heating means is provided for maintaining the milk at a constant desired temperature level, as it is supplied to the mixing head. Tank 16 represents a source of dilute acid solution, which is delivered to the head through a pipe 17, under the control of valve 18. The rates of flow of the skim milk and acid are such as to produce a desired and constant degree of acidulation. From the mixing head 11 the acidulated material flows continuously through the extended tube 10, during which time precipitation proceeds to the point of substantial completion, and coalescence of precipitated casein occurs. It will be evident that the tube 10 can be bent in such a manner as to occupy a minimum amount of space, as for example zigzag fashion or helicoidally.

An important feature of the present process is that conditions are so controlled within the extended tube 10, as to produce not only substantially complete precipitation of casein, but also to cause the casein to coalesce whereby a rope-like casein curd is discharged. We have discovered that this can be successfully accomplished by utilizing a controlled flow rate through the tube 10, particularly a flow rate which for the cross sectional flow area of the tubing, causes a condition of laminar flow throughout the length of the tubing.

Assuming that ordinary commercial skim milk is employed which contains about 9.0% solids, the rate of acid introduction is such as to acidulate the skim milk to at or near the isoelectric point of the casein at the temperature employed. At temperatures ranging from 70 to 115° F., casein has an isoelectric point at about pH 4.6. In practice for the manufacture of a good quality edible casein curd, we have employed acidulation to a pH of 4.2 to 4.7, and preferably 4.6 to 4.7, for temperatures ranging from 95 to 115° F.

The acid employed can be an inorganic acid like sulphuric or hydrochloric, or an organic acid like lactic. In any event it is desirable to introduce the acid in the form of a dilute aqueous solution, such as 3.3% hydrochloric acid.

As previously stated, the rate of flow through the tube 10 is such as to produce certain desired results, particularly progressive precipitation of casein and coalescence of precipitated casein to form a curd of rope-like form. For a tubing of a particular size a suitable flow rate can be determined by trial. When the flow rate is below a proper operating range, the precipitated casein tends to adhere to and accumulate upon the sides of the tube, thus causing clogging. When the flow rate is greater than the proper range, turbulence is excessive and the precipitated particles of casein do not coalesce to form the desired rope-like curd. When operating within a proper range of flow rate, the precipitated particles of curd gradually coalesce together to produce a soft rope-like curd which flows along with the whey through the tubing as a soft flexible core. In addition to the foregoing, the length of the tubing for the flow rate employed should be such as to provide time for substantially complete precipitation and coalescence.

By way of example for 3/8 inch tubing (I. D.), good results have been secured by utilizing a flow rate within the range of from 1 to 3 litres of skim milk per minute with acidulation to produce a pH of 4.2 to 4.7. For the same tubing and flow rates the length for good results can range from sixteen to thirty-four feet, to provide total treatment times of 22 seconds or more. Practically all of the curd discharging from such tubing is in the form of a soft rope of uniform diameter, with practically no fines. While 3/8 inch tubing has been used with good results, tubing of larger sizes can be used if desired. However, it will be evident that larger tubing will require a greater flow rate and a longer length.

In Figure 2 we have schematically illustrated the discharging casein curd 21 as a soft rope-like mass. It is carried along through the tubing together with the whey. At the discharge end of the tube 10 the curd and the whey are shown discharging upon the screen 22, which may be a drum or an endless belt as illustrated. Whey is thus permitted to drain from the curd, and the curd is delivered to a tank 23 or other receiving means. While on the endless screen 22 the curd can be subjected to washing. Curd made in this manner can be salted or otherwise processed to form a product like commercial cottage cheese, or it can be processed by other known methods to form various casein or casein containing products.

In one particular instance the apparatus was constructed and operated as follows: The tubing was 3/8 of an inch in diameter (I. D.) and 20 feet long. Skim milk at a temperature of 105° F. was supplied to the mixing head at one end of the tubing at a flow rate of 2.8 pounds per minute. Dilute hydrochloric acid was supplied to the mixing head at a controlled rate whereby the skim milk was acidulated to about pH 4.6. Casein curd was discharged from the tubing continuously in the form of a soft rope with a minimum amount of casein fines. The amount of casein thus recovered amounted to about 98.5% of the casein coagulated.

In the foregoing example the flow rate of the skim milk through the tubing provided a Reynolds number of the order of about 2200. Higher flow rates can be used, such as rates providing a Reynolds number of the order of 4400 or higher, although the higher flow rates tend to increase casein losses. In general the Reynolds number is influenced by factors such as the changing viscosity of the liquid, and by the varying size, shape and amount of the precipitated solids. Therefore the numbers just stated are difficult to apply numerically to various conditions. For practical purposes it is more satisfactory to employ a flow rate which will provide laminar flow, with a minimum flow time of about 22 seconds, assuming that the conditions are otherwise favorable for precipitation.

It will be evident that the process described above makes possible the continuous manufacture of a uniform casein curd. The delivered curd is of such form that it can be readily washed without excessive casein loss. All of the process is carried out rapidly in closed apparatus, and therefore there is limited opportunity for bacterial development or contamination. A minimum amount of labor and supervision is required for operation of the process and apparatus. The apparatus is relatively simple and inexpensive, and can be constructed to occupy a minimum amount of floor space. After washing, the curd has properties making it desirable for use in the process of said co-pending application.

The capacity of the apparatus can be varied as desired. In general greater capacity is obtained by using larger tubing of greater length. Also capacity can be increased by using two or more lengths of tubing operated in parallel, each with a separate mixing head or with a common mixing head provided the flow distribution to the several tubes is equalized.

While the invention has been described as applied to skim milk, it is possible to use other liquid lacteal material which has a substantial amount of natural casein in colloidal solution. For example the material may be skim milk from which a portion of the normal lactose content has been removed. Also it is possible to use material having a higher solids content than normal skim milk, such as skim milk that has been concentrated by vacuum evaporation.

Although the invention is particularly applicable to the manufacture of a casein curd such as cottage cheese, the procedure can be used for the precipitation and separation of various colloidal or soluble materials from solution where precipitation can be caused by such factors as pH adjustment, electrolytes, heat, solvents or other precipitants or combinations thereof, and where the precipitated material has such properties that it tends to agglomerate or coalesce. As examples of other colloidal solutions, reference can be made to aqueous protein extracts made from soybean flour, peanut flour and cotton seed meal.

We claim:

1. In a process for the manufacture of casein curd from a lacteal material containing casein in colloidal solution, causing an acidulated stream of the lacteal material to flow continuously through an elongated path that confines the stream on all sides to initiate and complete progressive precipitation of casein and to cause continuous coalescence in said path to form a moving rope-like curd mass therein.

2. In a process for the manufacture of casein curd from a lacteal material containing casein in colloidal solution, continuously commingling a stream of the lacteal material with a stream of acid whereby the milk is acidified to initiate precipitation of casein, and then causing the acidified material to flow continuously along a substantially unobstructed extended path that confines the stream on all sides with progressive precipitation of casein curd and continuous coalescence of the curd in said path to form a moving rope-like casein mass therein.

3. In a process for the manufacture of casein curd from a lacteal material containing casein in colloidal solution, continuously commingling a stream of the lacteal material with a stream of acid whereby the lacteal material is acidified to initiate precipitation of the casein therefrom, and then causing the combined acidified material to flow continuously along an extended and substantially unobstructed path that confines the stream on all sides with progressive continued precipitation of the casein curd and with progressive coalescence of the curd in said path into the form of a rope-like mass which moves continuously with the flow, delivering the curd and the resulting whey from the confined path and then separating the curd from the whey.

4. A process as in claim 3 in which the acidified lacteal material has an acidity within the range of pH 4.2 to 4.7 after acidulation.

5. In a process for the manufacture of casein curd from a lacteal material containing casein in colloidal solution, causing an acidulated stream of the lacteal material to flow continuously through an elongated and substantially unobstructed path concomitant with progressive precipitation of casein, the stream being confined by the path on all sides, the rate of flow through said path being controlled to cause coalescence of the precipitated material and continuous movement of the same with said flow.

6. In a process for the manufacture of casein curd from a lacteal material containing casein in colloidal solution, causing an acidulated stream of the lacteal material to flow continuously through an elongated and substantially unobstructed path concomitant with progressive precipitation of casein, the stream being confined by the path on all sides, the rate of flow through said path being controlled to cause progressive coalescence of precipitated casein into the form of a rope-like mass, said mass moving along with the flow.

7. In a process for the manufacture of casein curd from normal skim milk, causing an acidulated stream of the skim milk to flow continuously through an elongated and substantially unobstructed path concomitant with progressive precipitation of casein, the stream being confined by the path on all sides, the flow velocity through the confined path being such as to provide a Reynolds number of the order of 2200 to 4400 or more, with a time period for passage through the extended path of the order of from 22 to 33 seconds or more, and continuing such flow to a point of discharge, casein curd during such flow coalescing into the form of a rope-like curd which is delivered continuously at the point of discharge.

8. A process as in claim 3 in which the stream is substantially uniform in cross-sectional flow area for substantially its entire length.

9. In a process for the manufacture of casein curd from a lacteal material containing casein in colloidal solution, continuously commingling a stream of the lacteal material with a stream of acid whereby the lacteal material is acidified to initiate precipitation of the casein therefrom, and then causing the combined acidified material before any substantial amount of precipitation has occurred to flow continuously along an extended and substantially unobstructed path that confines the stream on all sides with progressive continued precipitation of the casein curd and with progressive coalescence of the curd in said path into the form of a rope-like mass which moves continuously with the flow, delivering the curd and the resulting whey from the confined path and then separating the curd from the whey.

10. A process for the manufacture of a precipitated protein material from an aqueous solution of the same, the protein material being characterized by the fact that when precipitated from the solution it has properties tending to cause it to coalesce or agglomerate, continuously commingling a stream of the solution with a stream of acid, whereby the solution is acidified to initiate precipitation of the protein material therefrom, and then causing the combined acidified material, before any substantial amount of precipitation has occurred, to flow continuously along an extended and substantially unobstructed path that confines the stream on all sides with progressive continued precipitation of the protein material and with progressive coalescence of the protein material in said path into the form of a rope-like curd mass which moves continuously with the flow, delivering the curd mass and the remaining liquid fraction from the confined path and then separating the curd mass from the liquid fraction.

References Cited in the file of this patent

UNITED STATES PATENTS

| | | |
|---|---|---|
| 1,112,722 | Scharff | Oct. 6, 1914 |
| 1,716,799 | Sheffield | June 11, 1929 |
| 1,992,002 | Chappell | Feb. 19, 1935 |
| 2,044,282 | Chickner | June 16, 1936 |
| 2,099,379 | Spellacy | Nov. 16, 1937 |
| 2,278,670 | Rauer | Apr. 7, 1942 |
| 2,369,095 | Wendt | Feb. 6, 1945 |